United States Patent [19]

Cameron

[11] Patent Number: 5,302,353
[45] Date of Patent: Apr. 12, 1994

[54] CATALYTIC CONVERTER

[76] Inventor: Gordon M. Cameron, 4 Wellesbourne Crescent, Willowdale, Ontario, Canada, M2H 1Y7

[21] Appl. No.: 13,536

[22] Filed: Jan. 28, 1993

Related U.S. Application Data

[63] Continuation of Ser. No. 826,534, Jan. 24, 1992, abandoned.

[51] Int. Cl.⁵ ............................................. B01D 50/00
[52] U.S. Cl. .................................. 422/171; 422/177; 422/191; 422/181; 422/193; 423/533
[58] Field of Search ............... 422/171, 177, 191, 181, 422/193, 176, 239; 423/532, 533

[56] References Cited

U.S. PATENT DOCUMENTS

| | | | |
|---|---|---|---|
| 2,230,467 | 2/1941 | Nelly, Jr. et al. | 422/171 |
| 3,433,600 | 3/1969 | Christensen et al. | 422/191 |
| 3,443,910 | 5/1969 | Newman et al. | 422/171 |
| 3,498,752 | 3/1970 | Kuo | 422/191 |
| 3,746,515 | 7/1973 | Friedman | 422/191 |
| 4,205,044 | 5/1980 | Gramatica | 422/191 |
| 4,335,076 | 6/1982 | McFarland | 422/181 |

Primary Examiner—Robert J. Warden
Assistant Examiner—Hien Tran
Attorney, Agent, or Firm—Cushman, Darby & Cushman

[57] ABSTRACT

A converter comprising an exterior shell of a strong, heat resistant weldable metal having an interior core tube formed of such metal and vertically disposed, partway within the shell from an upper part thereof. A foundation is provided from which the shell vertically extends. A plurality of catalyst beds are arranged one above the other within the shell and comprise at least one full catalyst bed having a first full bed extending essentially across a lower part of the shell, and at least one annular catalyst bed having a first annular bed between the shell at an upper part thereof and the core tube. Partitions define with the core tube a plurality of distinct, non-concentric, non-coaxial gas passages within the core tube. Each of the annular beds is in singular, gaseous communication within the shell with at least one of the passages. The converter has minimal axial gaseous flow transfer passages for maximum catalyst bed volume while preserving axial access to the beds.

6 Claims, 5 Drawing Sheets

CATALYTIC CONVERTER

This is a continuation of application Ser. No. 07/826,534, filed on Jan. 24, 1992, which was abandoned upon the filing hereof.

FIELD OF THE INVENTION

This invention relates to catalytic converters of the kind used to convert gaseous reactants to gaseous products, and more particularly to the conversion of sulphur dioxide gas to sulphur trioxide gas in the manufacture of sulphuric acid.

BACKGROUND OF THE INVENTION

Converters presently used to convert sulphur dioxide gas to sulphur trioxide gas are typically large cylindrical vessels comprising a shell containing a number of catalyst beds disposed one above the other. The processed gases pass through the catalyst beds in several, optionally desired sequences and are cooled between beds both to recover the heat generated in each bed and to assist in the kinetics and equilibrium of the reaction. Each bed is separated from other beds by division plates or membranes.

Classically, in sulfuric acid manufacturing plants, converters were fabricated from carbon steel, cast iron, and brick, when these materials were the only ones available. Carbon steel was used for the shell and cast iron posts, beams, and plates or sections were assembled inside the converter to support the many beds of catalyst.

In an alternative design, brick structures were erected for the same purpose, with steel being used for the external shell. At the time such converters were designed, manufacturing plants were small in capacity and gas strengths were low, which resulted in modest gas temperatures. In addition, platinum catalyst was used which tended to required operations at temperatures below those at which present-day catalysts operate. Vanadium catalyst, much larger plant capacities with higher internal pressures and much higher gas strengths have drastically increased the mechanical loads on such converter shells, while at the same time the conventional carbon steel becomes hotter and, hence, much weaker. Distortion of the vessel and, thus, leakage are, therefore, more common. However, such converters are well-known in the industry and a discussion of their features can be found in many references to sulfuric acid manufacture.

It has been known for many years that stainless steel is much stronger than carbon steel at temperatures now found in sulfuric acid plant converters as well as possessing resistance to scaling caused by hot sulphur dioxide containing gases. In the last ten to fifteen years a number of stainless steel converters have been built and are in operation.

One such converter type is described in McFarland U.S. Pat. No. 4,335,076, wherein is used a vertical, cylindrical, stainless steel shell having horizontal catalyst beds, one above the other, with the catalyst beds being supported in part from the shell. In a preferred embodiment, the beds and divider plates are supported from a hollow cylindrical core tube, as well as the shell, with the catalyst being contained in the annulus between the core tube and the shell. The vertical cylindrical core is co-axially located and extends the full height of the shell from the bottom of the converter to the top.

In some commercial applications of U.S. Pat. No. 4,335,076, the core tube contains a heat exchanger which cools gases between the catalyst beds and, in at least one case, two pieces of heat transfer apparatus are contained within the core tube. Gas is fed to catalyst beds either from an annulus around the bed in the case of the first bed, with radially, inward flow to the space above the catalyst or, in the other beds, horizontally, radially outward from the core of the vessel, with the gas entering the core from the top of the vessel.

This approach has proven reasonably successful but lacks versatility in many ways. Use of the large diameter core requires a larger-sized converter if the same bed cross-sectional area as is typically used in a sulphuric acid plant, is desired, which results in a larger and more expensive vessel. In addition, axial entry of gases as is taught in U.S. Pat. No. 4,335,076, is often not convenient for the designer of sulphuric acid plant systems because it requires more ducting. Inclusion of heat transfer equipment in the converter as is disclosed in U.S. Pat. No. 4,335,076, is superficially more attractive, but restricts process design freedom. With internal equipment, it is also no longer practically possible to parallel some of the heat exchange steps and provision of effective by-passes around the internal equipment is more difficult. It also complicates preheating of the plant and cooling for catalyst screening. Further, the converters of U.S. Pat. No. 4,335,076 do not offer an effective method for introducing gases to catalyst beds through the vertical wall of the vessel.

SUMMARY OF THE INVENTION

An object of the present invention is to provide a catalytic converter which minimizes the volume of the converter occupied by axial gaseous flow transfer passages and maximizes space occupied by the catalyst, while preserving axial access to catalyst beds.

A further object of the invention is to offer effective methods of introducing gas to and removing gas from the interior of the converter.

In yet a further object the invention provides a converter which allows of good gas distribution therein, and internal transfer between passes.

Other and further objects and advantages of this invention will become apparent upon reading the following specification taken in conjunction with the accompanying drawings.

Accordingly, in its broadest aspect the invention provides a converter comprising an exterior shell of a strong, heat resistant weldable metal; an interior core tube of said material vertically disposed, partway within said shell from an upper part thereof; foundation means from which said shell vertically extends; a plurality of catalyst beds arranged one above the other within said shell, and comprising at least one full catalyst bed comprising a first full bed extending essentially across a lower part of said shell, and at least one annular catalyst bed comprising a first annular bed between said shell at an upper part thereof and said core tube; tube means defining with said core tube a plurality of distinct, non-concentric, non-coaxial gas passages within said core tube; and wherein each of said annular beds is in singular, gaseous communication within said shell with at least one of said passages.

By the term "distinct, non-concentric, non-coaxially gas passage" is meant those designs where the core tube or a part thereof is divided into separate and distinct passages, other than as formed by a series of co-axially arranged tubes within tubes within the core tube, in a non-coaxial relationship with the core tube and shell.

Each of the annular beds is in singular, gaseous communication with a passage whereby gas flows to or from the passage through the annular bed. No two beds are in direct gaseous communication with the same passage. However, an annular bed may be in gaseous communication with two passages whereby gas enters the annular bed from one passage and exits to another passage.

The core tube may extend substantially the height of the shell and, optionally, be in gaseous communication with the uppermost full catalyst bed. Clearly, the downwardly extending core tube will extend the desired length from the top of the converter as selected by the designer and its height will depend inter alia on the number of beds with which it is meant to be in gaseous communication.

Most preferably the core tube is of a truncated frusto conical form which, in the still more preferred form, is largest at the top of the converter and decreases in diameter with decreasing elevation to recognize the smaller number of streams to be contained therein. Such a conical form increases the cross-sectional areas of the catalyst beds as the core diameter decreases which allows larger catalyst volumes to be used and gives less flow resistance. Such a frusto conical form significantly, advantageously allows of a maximum bed cross-sectional area, which allows more catalyst to be held and catalytic conversion efficiency, and decreases flow resistance.

It will be readily understood by the man skilled in the art that various variations and modifications to the numbers of full catalyst beds and annular catalyst beds and the sequence of gas feeding to each respective catalyst bed can be selected.

The above described converters according to the invention are also readily adapted to be advantageously utilised with gas ports in the side of the shell, preferably a round form, to effect axial gas flow, either into or out of a bed.

In a more preferred embodiment of the invention as hereinbefore defined, the converter stands upon foundation means comprising a raised single or polysided base such as a ring wall or, as formed from a plurality of individual posts on the circumference of the base of the converter, which base with the bottom of the converter defines an inner space which assists dissipation of unwanted heat from the lower part of the converter. An alternative with supports within the ring on polygon is also a feasible alternative.

BRIEF DESCRIPTION OF THE DRAWINGS

In order that the invention may be better understood a preferred embodiment will now be described by way of example only with reference to the accompanying drawings wherein.

DESCRIPTION OF A PREFERRED EMBODIMENT

Figure 1:
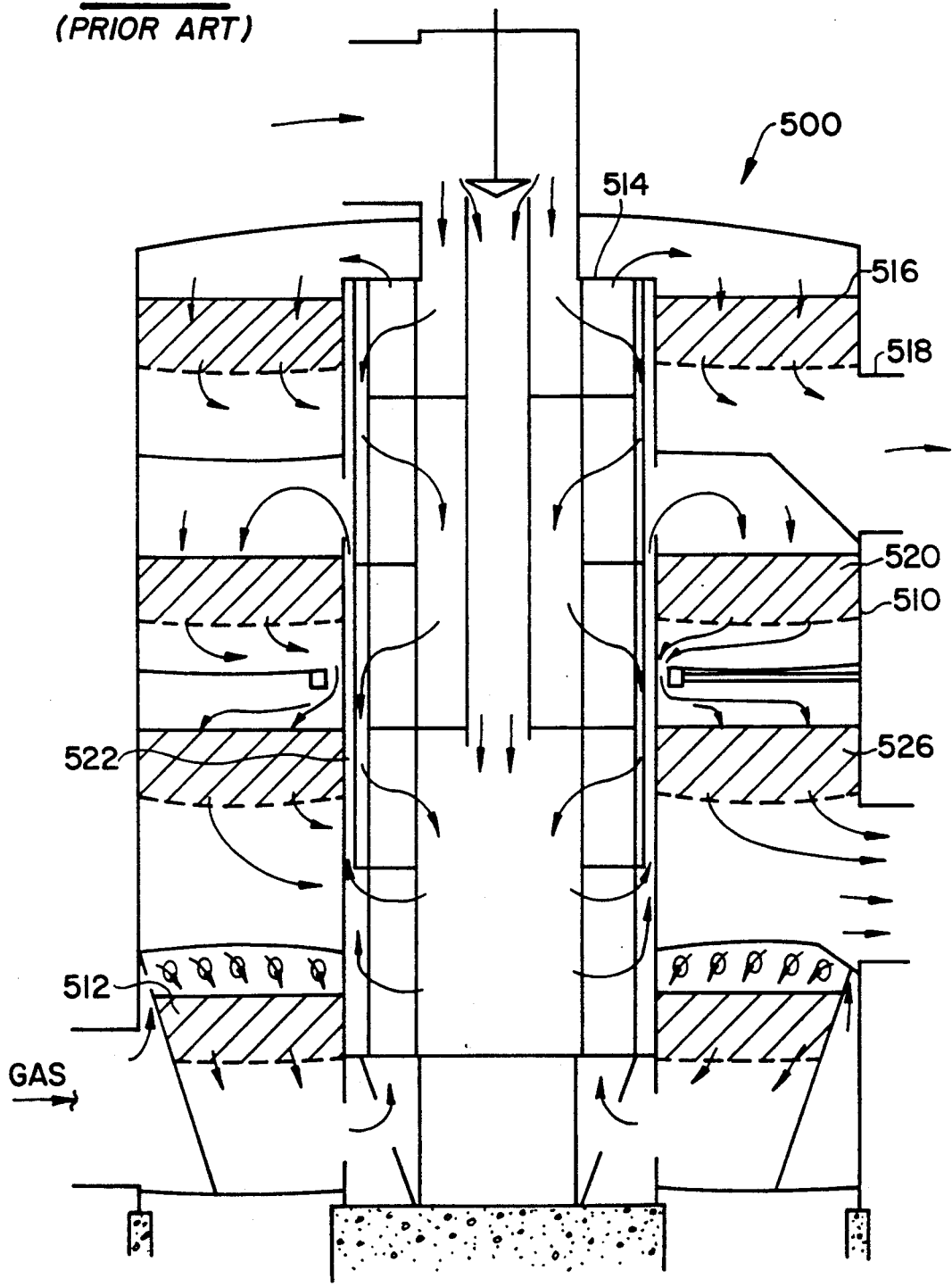
FIG. 1 is a diagramatic sketch of a prior art converter according to U.S. Pat. No. 4,335,076.

FIG. 1 shows a prior art converter, shown generally as 500, according to U.S. Pat. No. 4,335,076. A sulphur dioxide containing stream at a suitable temperature for conversion enters shell 510 below the lowest converter bed 512 in the converter. The gas passes around bed 512 and upward in a plenum lying between the shell 510 and a basket holding bed 512. Above bed 512, the gas passes radially inward through the support for bed 512 and then down through bed 512. The gas then flows to the axis of the converter from the plenum located below bed 512 and upward through a heat exchanger 514 and discharging into the space above second bed 516. The gas then flows downward through second bed 516 and out of converter 500 through an exit 518 in the side wall of the converter inset into the space below bed 516 and part of the space above the next lower catalyst bed 520. After processing, the gas stream next re-enters converter 500 at the top and flows down into the shell space of the heat exchanger 514 where it is heated up by the gas from bed 512. The heated gas then passes upward through an annular space 522 between exchanger 514 and the core tube and outward into the space above the third bed 520. In the embodiment shown, the gas flows down through bed 520 and inward to an annular passage outside the core where it is diluted by an air stream which cools the gas prior to entry to the fourth and last catalyst bed 526. After passage through last catalyst bed 526, the gas leaves the converter.

As shown, the arrangement for first bed 512 is complex as shell 510 and catalyst bed structures are separate and the gas enters the converter below the bed. This arrangement is too complex for all beds. Axial entry to the shell with transfer from the core to the individual bed is shown for all other beds but may not suit the exchanger converter system. Also, the arrangement for transfer between beds with air dilution is such that good mixing may be difficult to achieve. Good side entry and internal mixing of gases are therefore areas in which existing technology can be improved.

The inclusion of a hot heat exchange vessel in the core of the vessel also is not without potential problems. One such problem resides with the foundation, which now must carry a heavy load on the axis of the converter. The heat exchanger is hot and heat must dissipate from this foundation into the ground in such a way that the typical concrete base is not overheated in the core. In addition, it is hard to bypass gas around a heat exchanger which is buried in the converter core and by-passing is normally necessary to provide temperature control in the catalyst beds as well as for starting up the plant from cold conditions. A further disadvantage is that the exchanger in question may not easily be operated in parallel with other exchangers. If it is necessary to cool down the plant quickly for catalyst screening, the internal exchanger also can hold a large amount of heat and delay the cooling process.

Figure 2:
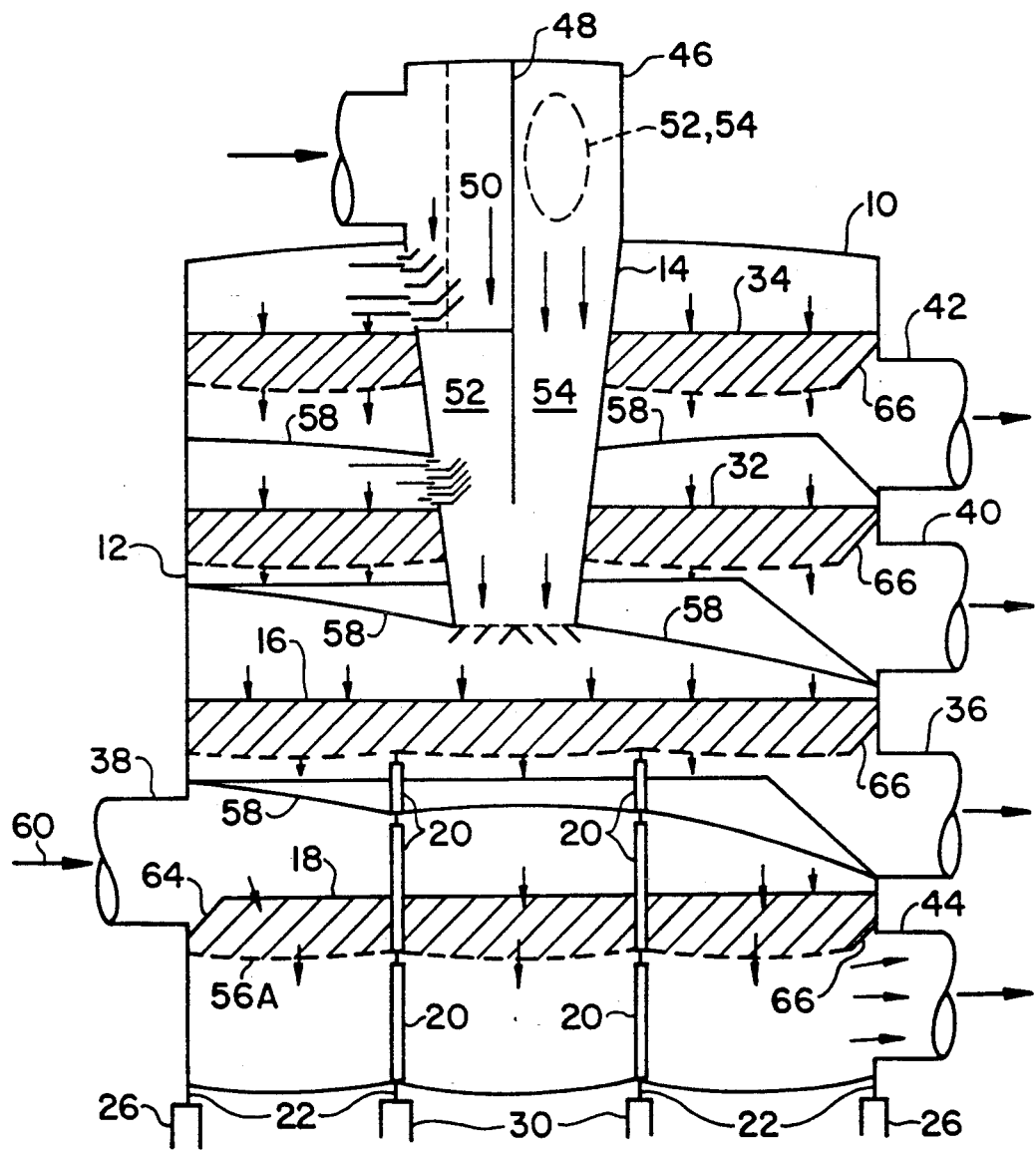
FIG. 2 is a diagramatic sketch of a preferred converter of the present invention.

Reference is now made to FIG. 2 which shows a converter generally identified as 10 and having an exterior shell 12 formed of 0.6 cm thick stainless steel—a strong, heat resistant weldable material. Other suitable materials such as titanium or titanium alloys may be used for shell 12. Shell 12 may typically be 30 to 40 feet in diameter and 40 to 50 feet in height.

Vertically disposed within shell 12 is a truncated frusto conical core tube 14 extending approximately halfway into shell 12 from the top thereof.

Figure 6:
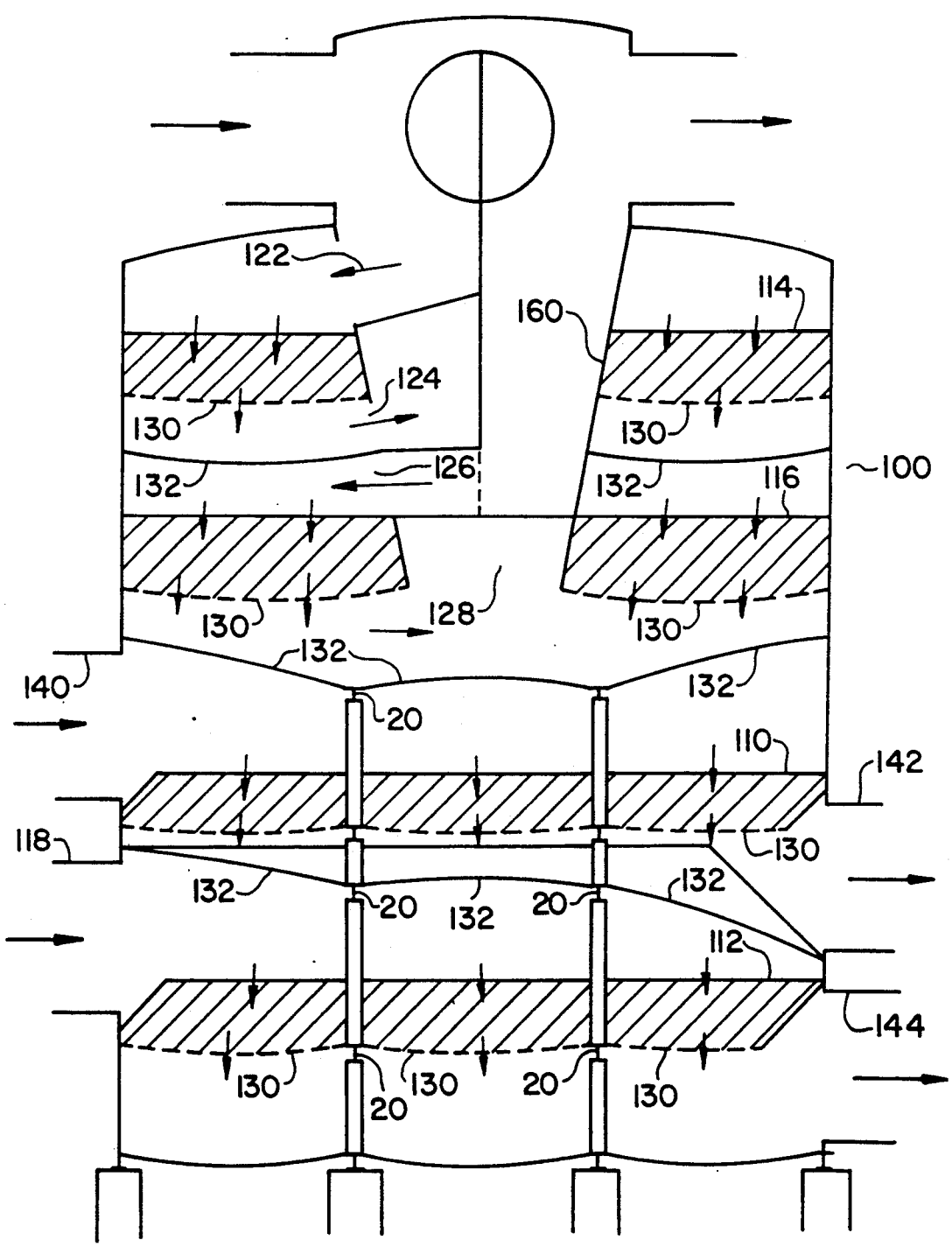
FIG. 6 is a diagramatic sketch of an alternative embodiment according to the invention; and wherein the same numerals denote the same parts throughout the Figures and arrows denote gas flow.

Located within shell 12 at a lower part thereof are two full catalyst beds 16 and 18, extending essentially across shell 12 bed 16 disposed above bed 18. Beds 16 and 18 are supported by support members 20, which rest upon base or post 22. With reference also to FIG. 6, base 22 is supported at its circumference by a raised horizontal hexagonal steel foundation ring (not shown) resting on concrete pillars 26, and interior support concrete members 30.

Located within an upper part of converter 10 between shell 12 and core tube 14 are two annular beds 32 and 34. Annular bed 32 has an advantageously greater catalyst bed cross-sectional area than that of upper annular bed 34 in consequence of tapered tube 14 having a small diameter at its point of attachment to bed 32 than at its point of attachment to bed 34.

Each of the full and annular beds, 16, 18 and 32, 34, respectively, are in singular gaseous communication with individual circumferential gas ports 36, 38, 40 and 42, associated therewith, respectively, provided in shell 12. In addition, lower full bed 18 is in gaseous communication with an additional circumferential gas port 44. Each of these gas ports allow gaseous flow either into or out of its respective catalyst bed. Thus, in the embodiment shown, sulphur dioxide gas reaches bed 18, the first bed, through port 38 by radial flow into shell 12 and substantially axial flow into catalyst. This gas passes through bed 18 and exits the converter in axial flow through port 44.

With particular reference to the embodiment shown in FIG. 2, tube 14 extends above the top of shell 12 and has raised portion 46. In conjunction with raised portion 46, tube 14 is provided with partition walls 48 which create a plurality, three in the embodiment shown, of distinct, non-concentric, non-coaxial gas passages 50, 52, and 54, within tube 14, wherein bed 34 is in singular, gaseous communication within the shell 10 with passage 50, bed 32 is in singular gaseous communication with bed 52 only, and passage 54 is in gaseous communication with only bed 16. Appropriate gases enters raised portion 46 of tube 14 through the respective entrances of passages 50, 52 or 54 as is appropriate. Passage of the respective gases is through passages 50, 52 and 54 to beds 34, 32 and 16, respectively, and exits through ports 42, 40 and 36, respectively, for further distribution as appropriate.

Figure 3:
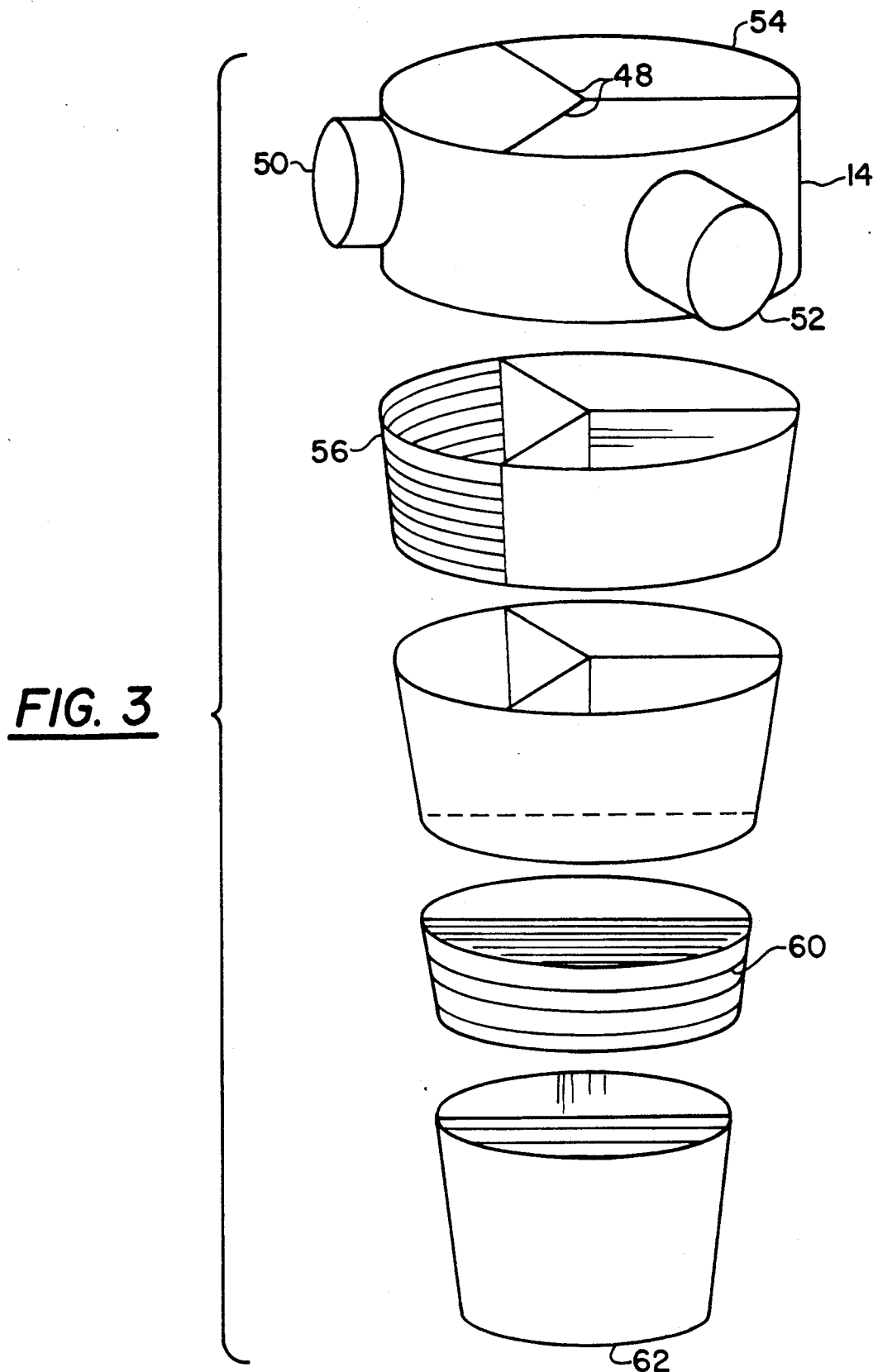
FIG. 3 is an exploded, perspective view of sections of a preferred core tube of use in a converter according to the invention.

With particular reference to FIG. 3, it shows a cutaway view of the frusto conical cone 14 where three passages in the cone are used to feed gas to the top three beds, 34, 32 and 16. Gas enters the cylindrical top through nozzles 50, 52 and 54 as shown on FIG. 4. Gas entering at 50 passes downward in passage 50 and enters the space above bed 34 through a gas distributor 56 which extends up to 120° around the cone and with a maximum height equal to the distance from the converter roof to the top of bed 34. Below the top of bed 34, passage 50 is sealed with a horizontal plate welded to vertical partitions 48 and the cone, and at the point partitions 48 forming the vertical walls of passage 50 also stop. The third partition extends completely across the cone and divides the vertical cone into two halves and projects downwardly to immediately below gas distributor 60 through which the gas in passage 52 enters the plenum above bed 32. This distributor can extend 180° around the cone. Passage 52 is now sealed as a horizontal semi-circle leaving the space below in communication with passage 54 and through distributor 62 with bed 16.

It will be readily understood by those skilled in the art that the shape, size and arrangement of the partitions creating with tube 14 passages 50, 52, and 54, will be determined for maximum efficiency of gas flow, sulphur dioxide and sulphur trioxide concentrations and ratios, and gaseous temperatures as readily determined by the man skilled in the art. Since the order of the bed sequence and gaseous flow thereto can be readily varied dependent upon the full plant environment within which a converter according to the invention is to be used alternative bed layouts and the like can be readily designed.

One such alternative bed layout is shown in FIG. 6 wherein the converter, shown generally as 100, has at a lower part two full beds, 110 and 112. At the upper part of converter 100 are two annular beds, 114 and 116. Bed 110 has inlet gas port 140 and exit gas port 142, bed 112 has inlet gas port 118 and exit gas port 144. In each case gas exits and enters the respective port in radial flow into the converter with subsequent intervening passage through the respective bed.

Bed 114 has a radial flow inlet gas port 122 in gaseous communication therewith. As can be seen in FIG. 6 gas exits bed 114 through core tube passage 124. Similarly, input gas and output gases pass through bed 116, via passages 126 and 128 in tube 160.

In each embodiment, each catalyst bed is supported on a stainless steel support plate 56A in FIG. 2 and 130 in FIG. 6. The support plates have holes therein to permit gas to pass therethrough and are preformed into a concave configuration to prevent excessive sagging when they are loaded and subjected to heat. The peripheries of the support plates of the annular beds are welded around their inner peripheries to the inner core tube 14 and are welded around their outer peripheries to exterior shell 12. The full catalyst beds are welded around their outer peripheries to exterior shell 12 and support members 20. The catalyst beds are separated by stainless steel division plates 58 (FIG. 2) and 132 (FIG. 6).

Figure 4:
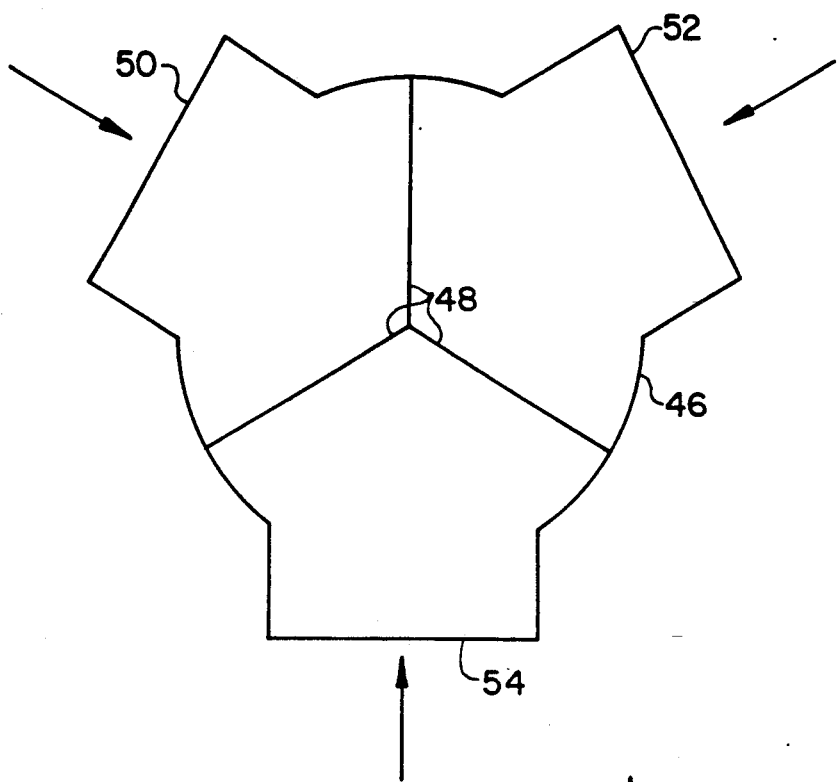
FIG. 4 is a diagramatic plan view of a section adjacent the top of a converter according to the invention.
Figure 5:
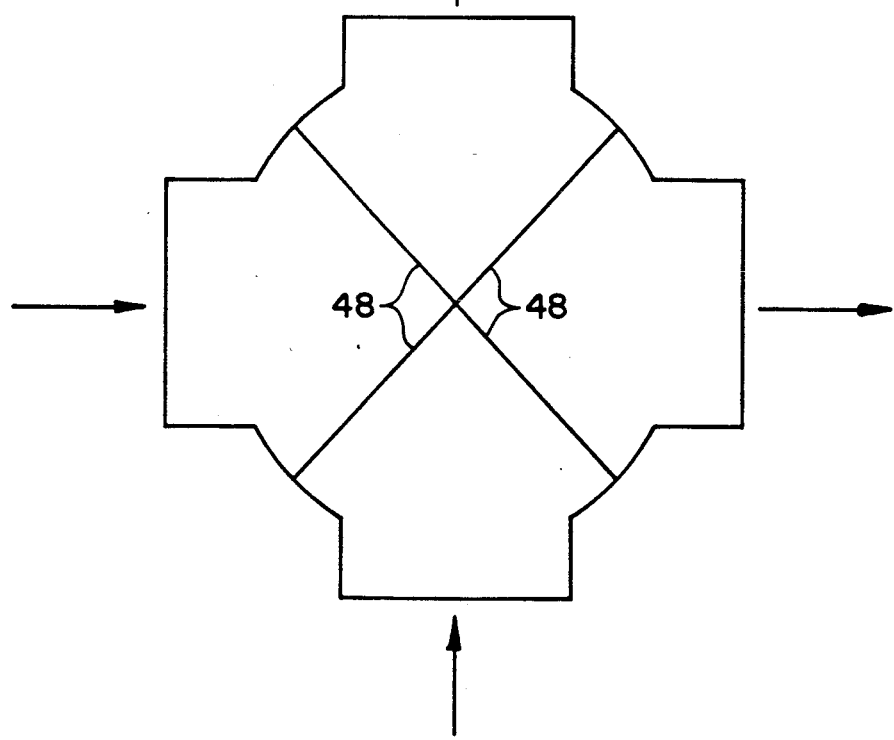
FIG. 5 is a diagramatic plan view of a section adjacent the top of an alternative embodiment according to the invention.

In operation, with particular reference to FIGS. 2 and 4, gas 60 containing sulphur dioxide to be converted to sulphur trioxide is preheated in a heat exchanger (not shown) and enters first bed 18 via port 38 in radial flow through shell 12 in radial flow. Inlet gas 60 flows through catalyst bed 18 and out through port 44 to a heat exchanger (not shown). The sulphur trioxide containing gas is returned from the heat exchanger to converter 10, after cooling, via passage 50 through catalyst bed 34, where more of the sulphur dioxide is converted to sulphur trioxide and exits converter 10 via port 42. The gas is then cooled and transfers to bed 32, via passage 52. After further conversion of the gaseous mixture in bed 32 the sulphur trioxide rich gas exits port 40 and transfers through an intermediate absorption tower (not shown) for absorption therein of the sulphur trioxide formed. The absorption tower exit gas is then heated and passed back to converter 10 and into passage 54 for final conversion in bed 16 and exits from converter 10 through port 36 for absorption in a final absorption tower.

In the lowest bed, 18, port 38 is larger than the space provide above the bed and is partly buried in the catalyst bed with an air-deflector 64 to cause the gas to flow upward to the distribution space above the bed. The extent of the intrusion into catalyst space will depend on the plant size and the system may include a gas distributor inside the converter where required by gas velocity. Port 44 takes gas from below bed 18 and by means of transitions 66 allows port 44 to be used to connect the outlet gas with external ducting without need for an additional transition.

The preferred design concept shown in FIG. 2 provides many options to the sulphuric acid plant designer. For instance, in regards to the upper parts of the converter according to the invention. Present technology as shown in U.S. Pat. No. 4,335,076, calls for axial entry of gas to the converter in a cylindrical central duct with coaxial annular spaces connecting to the various beds and with a 360° entry to each bed. This arrangement requires that the connections to the core are stacked above each other, adding to the height of an already high structure.

In instant application, the core is conical and is split with a sector for each bed so all nozzles can enter at the same elevation. Once a bed has been reached and the gas passed to the bed, the sector in question is then sealed and the cross-section divided between the remaining sectors. As a result, the core size can decrease as gas leaves the core and a cone is acceptable, leaving more converter cross-section for the catalyst bed. Simple plate dividers from one side to the other of the conical core are also less costly than a number of concentric tubes. Once the number of streams in the core has been reduced to 1, the core need only penetrate the divider into the space above the desired bed and the core can be terminated in an axial distributor, i.e. the last upper bed can also be full converter diameter. Support for the cone could come also from floor based posts which extend through the two lower beds although one skilled in the art could also support the cone from the roof of the vessel, transferring the load to the sidewall and hence the foundation.

A further variation of this design has the core used to transfer gas between beds through a core passage with addition of a quench stream. In such a case, gas from a catalyst bed would re-enter a section of the core through appropriate holes and would be mixed with a quench stream before passing through an appropriate distribution means to the desired catalyst bed. The use of core would allow the inclusion of devices to promote good mixing of the gas and quench stream, a feature not included in McFarland. Clearly, the quench stream could be added below the catalyst bed or could be added in the core, depending on which was most convenient. Clearly, gas could flow upward or downward in such a case, and beds could even be bypassed or parallel.

As mentioned hereinbefore the number and location of beds of a converter according to the inventor is completely open to the designer of sulphuric acid plants. The converter need not have a fixed diameter but could have a increase or decrease in diameter to suit the various beds.

In an alternative embodiment, the vertical conical tube increases in diameter with height. The transfer passages within the core tube could also be used to transfer gas from any bed to any other bed with cooling or quenching between.

While the core tube is described hereinbefore as a cone, it will also be obvious that a succession of cylinders of different diameter could be used with a conical transition between one cylinder and the next as one proceeds down the converter. As a further variant, the core tube arrangement would offer an easy paralleling of catalyst beds.

It will also be evident to the sulphuric acid plant designer that gas that enters and exits at the edge of the vessel could also use vertical lobes at the outer wall with dividers to suit the nozzle locations.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated.

The embodiments of the invention in which an exclusive property or privilege is claimed are defined as follows:

1. A converter comprising:
   an exterior shell of a heat resistant weldable metal;
   an interior core tube of said metal vertically disposed, partway within said shell from an upper part thereof;
   foundation means including internal support members and posts for the support of the internal support members and from which said shell vertically extends;
   a plurality of catalyst beds disposed one above the other within said shell and comprising:
     at least one full catalyst bed including a first full bed extending the full diameter of the converter across a lower part of said shell, and
     at least one annular catalyst bed including a first annular bed between said shell at an upper part thereof and said core tube;
   partition means defining with said core tube a plurality of distinct, non-concentric, non-coaxial gas passages within said core tube; and
   wherein each annular bed is in singular gaseous communication within said shell with at least one of said passages.

2. A converter as claimed in claim 1 wherein said plurality of catalyst beds further include a second full bed, a second annular bed, wherein said plurality of distinct passages comprises a first passage, a second passage and a third passage and wherein said first annular bed is in gaseous communication with said first passage, and said second annular bed is in gaseous communication with said second passage.

3. A converter as claimed in claim 2 wherein said plurality of catalyst beds further include a third annular bed in gaseous communication with said third passage.

4. A converter as claimed in claim 2 wherein said first full bed is in gaseous communication within said shell with said third passage.

5. A converter as claimed in claim 2 wherein said shell has a plurality of circumferential gas ports, each of said gas ports being in singular, gaseous communication with a single catalyst bed of said plurality of catalyst beds.

6. A converter as claimed in any one of claims 1 to 5 wherein said core tube is of a frusto conical form.

* * * * *